US010347085B2

(12) United States Patent
Simon

(10) Patent No.: US 10,347,085 B2
(45) Date of Patent: Jul. 9, 2019

(54) TOURNAMENT BASED ON POKER-LIKE GAMES BASED ON LIVE SPORTING EVENTS

(71) Applicant: Burton Simon, Silverthorne, CO (US)

(72) Inventor: Burton Simon, Silverthorne, CO (US)

( * ) Notice: Subject to any disclaimer, the term of this patent is extended or adjusted under 35 U.S.C. 154(b) by 112 days.

(21) Appl. No.: 15/288,386

(22) Filed: Oct. 7, 2016

(65) Prior Publication Data

US 2017/0103614 A1   Apr. 13, 2017

Related U.S. Application Data

(60) Provisional application No. 62/239,423, filed on Oct. 9, 2015.

(51) Int. Cl.
*G07F 17/32* (2006.01)
*A63F 13/828* (2014.01)

(52) U.S. Cl.
CPC ........ *G07F 17/3276* (2013.01); *A63F 13/828* (2014.09); *G07F 17/3225* (2013.01); *G07F 17/3248* (2013.01); *G07F 17/3269* (2013.01); *G07F 17/3288* (2013.01); *G07F 17/3293* (2013.01)

(58) Field of Classification Search
CPC ............. G07F 17/3276; G07F 17/3293; G07F 17/3225; G07F 17/3248; G07F 17/3269; G07F 17/3288; A63F 13/828
USPC .......................................................... 463/13
See application file for complete search history.

(56) References Cited

U.S. PATENT DOCUMENTS

| 4,429,877 | A | | 2/1984 | Coppock |
| 4,540,174 | A | | 9/1985 | Coppock |
| 4,592,546 | A | | 6/1986 | Fascenda et al. |
| 4,760,527 | A | * | 7/1988 | Sidley ............... A63F 13/12 463/13 |
| 5,283,734 | A | | 2/1994 | Von Kohorn |
| 5,462,275 | A | | 10/1995 | Lowe et al. |
| 5,564,701 | A | | 10/1996 | Dettor |
| 5,564,977 | A | | 10/1996 | Algie |
| 5,573,244 | A | | 11/1996 | Mindes |
| 5,683,090 | A | | 11/1997 | Zeile et al. |
| 5,749,785 | A | | 5/1998 | Rossides |
| 5,772,512 | A | | 6/1998 | Chichester |
| 5,830,069 | A | | 11/1998 | Soltesz et al. |
| 5,842,921 | A | | 12/1998 | Mindes et al. |

(Continued)

*Primary Examiner* — Michael A Cuff
(74) *Attorney, Agent, or Firm* — Leydig, Voit & Mayer, Ltd.

(57) ABSTRACT

A tournament played over a network consisting of rounds (hands) of a poker-like game based on the action in one or more live sporting events. The number of hands played, and the timing of those hands, are the same for every player in the tournament, and are independent of the number of players in the tournament. The number of players in the tournament can be arbitrarily large or small. The prize structure can also be independent of the number of players, and announced in advance. The tournament is preferably based on a collection of closely associated betting events, like the drives in a single football game; or a collection of closely associated sporting events. The poker-like games played in each round of the tournament utilize chips where the winners of the tournament are the players with the largest chip counts at the end of the tournament.

20 Claims, 1 Drawing Sheet

(56) References Cited

U.S. PATENT DOCUMENTS

| | | | | |
|---|---|---|---|---|
| 5,956,485 | A | 9/1999 | Perlman | |
| 5,957,775 | A | 9/1999 | Cherry | |
| 5,984,779 | A | 11/1999 | Bridgeman et al. | |
| 6,007,427 | A | 12/1999 | Wiener et al. | |
| 6,015,345 | A | 1/2000 | Kail | |
| 6,048,271 | A | 4/2000 | Barcelou | |
| 6,102,797 | A | 8/2000 | Kail | |
| 6,106,395 | A | 8/2000 | Begis | |
| 6,120,376 | A | 9/2000 | Cherry | |
| 6,126,543 | A | 10/2000 | Friedman | |
| 6,152,822 | A | 11/2000 | Herbert | |
| 6,236,900 | B1 | 5/2001 | Geiger | |
| 6,287,199 | B1 | 9/2001 | McKeown | |
| 6,296,250 | B1 | 10/2001 | Langan | |
| 6,331,148 | B1 | 12/2001 | Krause et al. | |
| 6,379,248 | B1 | 4/2002 | Jorash et al. | |
| 6,394,895 | B1 | 5/2002 | Mino | |
| 6,450,887 | B1 | 9/2002 | Mir et al. | |
| 6,468,156 | B1 | 10/2002 | Hughs-Bairn et al. | |
| 6,554,709 | B1 | 4/2003 | Brenner et al. | |
| 6,634,946 | B1 | 10/2003 | Bridgeman et al. | |
| 6,666,769 | B2 | 12/2003 | Stronach | |
| 6,910,965 | B2 | 6/2005 | Downes | |
| 8,128,472 | B1 * | 3/2012 | Lyons | A63F 1/18 273/138.1 |
| 8,360,842 | B2 | 1/2013 | Simon | |
| 9,524,072 | B1 * | 12/2016 | Feldstein | G06F 9/451 |
| 2005/0171878 | A1 | 8/2005 | Pennock | |
| 2006/0019736 | A1 | 1/2006 | Amada | |
| 2007/0015562 | A1 * | 1/2007 | Smith | A63F 1/00 463/13 |
| 2009/0039601 | A1 * | 2/2009 | Carpe | A63F 1/04 273/298 |
| 2009/0152813 | A1 | 6/2009 | Wolf | |
| 2009/0239627 | A1 | 9/2009 | Inamura | |
| 2010/0240448 | A1 | 9/2010 | Keenan et al. | |
| 2011/0111827 | A1 | 5/2011 | Nicely et al. | |
| 2012/0009984 | A1 * | 1/2012 | Amaitis | G07F 17/3244 463/4 |
| 2013/0005419 | A1 * | 1/2013 | Sediq | G07F 17/3288 463/8 |
| 2013/0137508 | A1 | 5/2013 | Kelly et al. | |
| 2014/0274257 | A1 * | 9/2014 | Burnside | G07F 17/3293 463/13 |
| 2015/0209679 | A1 * | 7/2015 | Givant | A63F 13/828 463/25 |
| 2015/0348373 | A1 * | 12/2015 | Weingardt | G07F 17/3258 463/32 |
| 2016/0023093 | A1 * | 1/2016 | Nieves | A63F 3/00041 273/277 |

\* cited by examiner

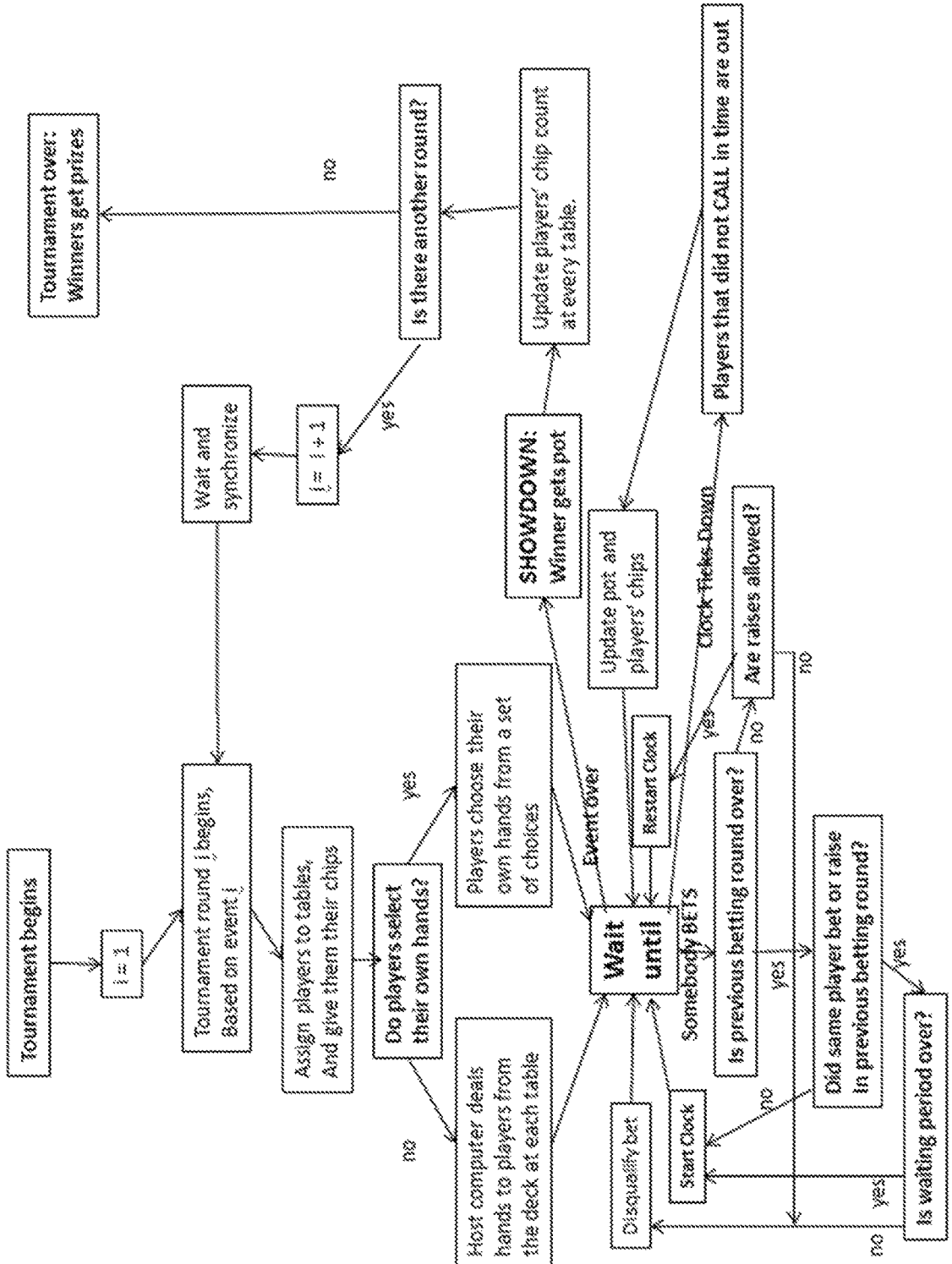

TOURNAMENT BASED ON POKER-LIKE GAMES BASED ON LIVE SPORTING EVENTS

CROSS-REFERENCE TO RELATED APPLICATIONS

This application claims priority to U.S. Provisional Application No. 62/239,423, filed Oct. 9, 2015, which is hereby incorporated by reference in its entirety to the extent not inconsistent with the disclosure herewith.

BACKGROUND OF THE INVENTION

The present invention relates to tournaments and more particularly to interactive tournaments where the participants play a poker-like game based on the action in one or more live events. U.S. Pat. No. 8,360,842 ("Poker-like games based on a live sporting event", Simon) discloses a non-limiting example of a poker-like game based on the action in live sporting events. The present invention provides modified versions of poker-like games which are further embedded in a tournament structure designed specifically for those poker-like games. The prior art does not disclose any tournament structure that can accommodate poker-like games such as disclosed in U.S. Pat. No. 8,360,842 or the modified poker-like games disclosed herein. The modified poker-like games described herein are also different from all other poker-like games in the prior art.

Traditional poker tournaments are very popular. There are high-profile tournaments like the World Poker Tour® and World Series of Poker that are extensively covered by the media, and countless lower-profile tournaments, for example, tournaments sponsored by colleges or held on cruise ships. Poker tournaments can be administered live (all participants are physically present at the same location) or online, and can feature just a few players at a single table, or tens of thousands of players playing at thousands of virtual tables. In every case though, the rules of the tournament are similar. Players start with equal stacks of chips (i.e., the buy in). The chips are only for playing, as they have no monetary value outside of the tournament. When players lose all their chips, they are eliminated from the tournament. The winner is the player that ends up with all the chips from the other players. Second place, third place, and so on, are determined by the order the players drop out.

Traditional poker tournaments are limited in the number of players who can directly play against each other. In general, the more players in a particular tournament, the longer a traditional poker tournament will last. It would not be possible, for example, to run a traditional poker tournament with one million players in a few hours, or even in a few days. With the present invention it is possible, for example, to play a poker-like tournament based on the action in a single football game, with millions of players, all in the three or four hours the football game lasts. With the present invention, very long tournaments are possible as well. For example, a tournament based on a season of (weekly) fantasy football contests could go on for months. The time frame of the present poker-like tournament invention closely mirrors the time frame of the sporting event or events it is based on, regardless of the number of players in the tournament.

In the context of poker-like tournaments based on live events, particularly a live sporting event, as described in the present invention, there is very little flexibility in the number of hands players play and when they are played, since the hands are linked to specific live events, or parts of live events. Traditional poker tournaments thus involve a large and unpredictable number of hands where the players do not all play the same number of hands, nor do players at different tables play their hands at the same times. Each table will play a different number of hands. Thus, the structure of a traditional poker tournament will not work for poker-like tournaments based on live events. A poker-like game based on a live sporting event must be played during that live sporting event since the values of the players' hands depends on the actions that occur during that live sporting event. In poker-like tournaments based on live sporting events, the live sporting events are specified ahead of time. Since the values of the hands will be based on those live sporting events, all the players' hands must be synchronized. In other words, all players (unless they have already been eliminated) play the same number of hands, and at the same times, as every other player. This feature cannot be accommodated in the traditional poker tournament format, so a new mechanism for running a tournament is needed.

Another feature of poker-like games based on live events of the present invention is that players can be allowed to choose their own hands, or parts of their hands, from a set of possible choices, instead of being dealt a hand randomly from a deck of cards. Thus the role of the dealer in the present invention is different than in traditional poker. Obviously, in traditional poker, if the players could choose their own hands they would all choose the best possible hand (e.g., a royal flush) and the game would be trivialized. However, in a poker-like game based on a live sporting event, it is not known in advance which hand will turn out to have the highest value, so allowing players to choose their own hand (or part of it) does not ruin the game. In fact, it can make the game more interesting, and adds to the level of skill needed to play the game well. Thus, a mechanism for providing a poker-like tournament where the players can select at least a portion of their hands, and then determining the value of those hands at the end of the live event, is also needed.

In view of the foregoing, it would be desirable to have a method to operate a tournament based on poker-like games in such a way that the number of rounds (and/or hands played) in the tournament does not depend on the number of participants, and the hands can be synchronized between all participants. It would also be desirable to run a tournament based on poker-like games where the players are allowed to choose some or all of their own hands. For example, it would be desirable to have a method to run a tournament based on poker-like games that coincide with the sporting events featured in daily fantasy sports contests. In that case, the hands could be the fantasy teams the players draft for themselves.

As another example, it would be desirable to have a method to run a tournament based on poker-like games that coincide with a championship tournament, such as the National Collegiate Athletic Association (NCAA) basketball tournament. In that case the hands would be the brackets filled out by the players. As another example, it would be desirable to have a method to run a tournament based on poker-like games that correspond to actions during a sporting event, such as the drives or sets of downs in a football game, and the players choose some or all of their hands from a special deck of cards. It would also be desirable to have a method to run a tournament based on poker-like games where players can initiate consecutive betting rounds after a waiting period. It would also be desirable to have a method to run a tournament based on poker-like games based on live sporting events where players can place bets (raises) during a betting round. It is believed that these modifications of the traditional poker tournament and poker-like game based on live sporting events results in a fundamentally new type of game and tournament structure.

SUMMARY OF THE INVENTION

The present invention generally relates to a tournament played over a network, such as the internet, a computer network, data network, or a mobile phone network, consisting of multiple rounds (hands) of a poker-like game based on the action in one or more live events, preferably live sporting events. The number of hands played, and the timing of those hands, are the same for every player in the tournament, and are independent of the number of players in the tournament. The number of players in the tournament can be arbitrarily large or small. The prize structure, if provided, can also be independent of the number of players, and announced in advance. The tournament is preferably based on closely associated events within a sporting event, like the halves or drives in a single football game or innings in a baseball game; or a series of daily fantasy sport contests; or the action in a championship tournament, like the NCAA football or basketball tournaments.

In an embodiment, the present invention provides a structure for a tournament based on a poker-like game that is implemented on a network. The currency for the poker-like tournament is chips, which serve the same purpose as in traditional poker tournaments. The rounds of the tournament correspond to one or more hands (rounds) of the poker-like game. All players in the tournament who have not been eliminated play the same number of hands and rounds, and at the same times, since the hands correspond to a predetermined sequence of sporting events or parts of sporting events (betting events) that form the basis for the tournament. If a player loses all their chips during the tournament, then that player is out of the tournament. However, players may not necessarily lose all their chips during the tournament. The players with the highest chip counts when the tournament is over are the winners.

In an embodiment, the present invention provides a method of playing a tournament between a plurality of players on electronic units connected through a computer network to a host computer, where the tournament comprises one or more tournament rounds and is based on a live event, preferably a live sporting event, comprising a plurality of betting events. The host computer administers the tournament by performing the steps of: a) announcing in advance to each of the electronic units a sequence of events that will be the basis for the rounds of the tournament; b) distributing an initial stack of chips to each player before a first round of the tournament; c) hosting one or more rounds of a poker-like game during each round of the tournament; and d) after the final tournament round, awarding prizes to the player or players with the highest chip totals. The players are able to join the tournament, view their hands, monitor the progress of each round, as well as place bets through the electronic units.

In an embodiment, hosting one or more rounds of the poker-like game comprises the steps of: i) assigning the players to virtual tables and providing each player with a stack of chips to play with during the round equal to the player's chip total at the end of the previous round, or the initial stack in the first round; ii) providing a player hand to each player through the computer network before or during a betting event, wherein the value of the player hands depends on what happens during the betting event; iii) providing one or more betting rounds during the betting event, wherein during the betting rounds the plurality of players are allowed to place bets through the computer network on the value of the cards distributed to the players; iv) keeping track of all antes, bets, raises and calls at every table during the betting rounds; v) determining a winner at each table in each round of the poker-like game, and awarding the antes, bets, and calls from the players at the table to the winner; and vi) updating the chip totals for each player.

In a further embodiment, the betting events at each table are the same as all other tables in the tournament and are provided at the same time. Preferably, during each betting round, a player can only initiate consecutive betting rounds after a waiting period, and players may be allowed to raise during a betting round.

In an embodiment, each round of the poker-like game is operated by the host computer, wherein the host computer is able to provide a deck of cards to the plurality of players, wherein the cards are electronic units maintained on the host computer and each card has a value determined by actions occurring during a betting event that occurs during a live event, preferably a sporting event. The host computer provides a player hand to each player by distributing a plurality of cards available from the deck to each player through the computer network before or during the betting event, wherein the value of the distributed cards depends on what happens during the betting event, and wherein each player hand has a value determined by combining the values of each card in the hand. Preferably, each player is able to select at least a portion the cards from the deck that the host processor distributes to the player's hand.

In an embodiment, the host computer further monitors the live event until a termination event occurs with regard to the betting event. The host computer provides one or more betting rounds during the betting event until the termination event occurs, wherein during the betting rounds the plurality of players are allowed to place bets through the computer network on the value of the cards distributed to the players. Upon termination of the betting event, the host processor determines a final value of the distributed cards for the terminated betting event, determines a final value of each hand by combining the final values of each card within the hand, and pays winners of bets placed during the betting rounds for remaining players based on the final value of each remaining player hand.

The values of the cards are determined by actions occurring during the live betting event, so they are not known with certainty until the betting event terminates. When the betting event terminates, the remaining player with the best hand wins the pot (the antes, bets, calls, and raises from the players at the table). In one embodiment, a player can make a bet at any time during a betting event, as long as the player is still in the game. If a player makes a bet, then each of the remaining players must call (match) or raise the bet within a given time or fold. In a further embodiment, a player can initiate consecutive bets within the same round after a waiting period. The time allowed for players at a table to call is bet can be a predetermined fixed time, or the allowed time can be random to provide incentives for players to quickly decide.

Optionally, one or more cards in each player's hand can be viewed by the other players. Preferably, the poker-like games played in each round of the tournament utilize chips (i.e., a generic and electronic unit of currency hosted on the host computer). Before or at the beginning of the first round of the tournament, each player will be provided with a stack of chips for the tournament. Preferably, the initial stack of chips for each player is the same size. The chip counts for the players transfer from the end of one round to the beginning of the next round. The winners of the tournament are the players with the largest chip counts at the end of the tournament.

In an embodiment, hosting the rounds of the tournament consist of the steps of:

i) Assigning players to tables, and providing each player with a stack of chips to play with during the round equal to the chip total at the end of the previous round, or the initial stack in the first round. Players that have not lost all their chips are reassigned tables after each round.

ii) Facilitating the process of assigning hands to players, where every player at every table is provided a hand at approximately the same time: preferably just before the associated betting event begins. In one embodiment of the poker-like game the players choose their own hands from a given set of possible choices, in another embodiment players' hands are dealt to them from a shuffled deck.

iii) Allowing players to place bets during the round, and to call bets made by other players during the round. Preferably, a player can initiate consecutive betting rounds after a waiting period, and players may be allowed to bet (raise) during a betting round. Optionally, a player cannot initiate consecutive betting rounds at a table, and players cannot place new bets (raises) while the previous betting round is in progress.

iv) Keeping track of all antes, bets, raises, and calls at every table during the round.

v) Determining the winner at each table in each round of the poker-like game, and awarding the pot (the antes, bets, and calls from the players at the table) to the winner.

vi) Updating all players' chip totals.

The individual rounds of the poker-like game in certain embodiments of the present invention are similar to the type disclosed in U.S. Pat. No. 8,360,842 (Simon) except with the following significant modifications: (1) players may be allowed to choose some or all of their own hands from a set of choices, (2) players may be allowed to initiate consecutive betting rounds after a waiting period, and (3) raises may be allowed during the betting rounds. The last two modifications are expressly forbidden in the poker-like game disclosed in U.S. Pat. No. 8,360,842 (Simon). Additionally, U.S. Pat. No. 8,360,842 (Simon) does not disclose the additional tournament structure disclosed herein.

The tournament is played on electronic units connected through a network, such as the internet, a computer network, data network, or a mobile phone network, between a plurality of players, where each electronic unit comprises a screen, an interface, and a processor. Examples of such electronic units include, but are not limited to, laptop computers, cell phones, personal digital assistants, and other mobile devices. Preferably, each electronic unit comprises a non-transitory computer readable medium encoded with instructions able to be executed by the processor of the electronic unit. The instructions encoded in the computer readable medium may be downloaded from the internet, such as a cell phone app. Each electronic unit is connected to a host computer which is capable of hosting multiple rounds of a poker-like game. Each electronic unit can allow one or more players to play the rounds of the poker-like game through the host computer.

BRIEF DESCRIPTION OF THE DRAWINGS

FIG. 1 is a flow diagram that shows how poker-like games are operated in the tournament structure in one embodiment of the invention.

DETAILED DESCRIPTION OF THE INVENTION

Definitions

As used to describe the present invention, the following terms are defined as follows.

The "house" is the generic name for the person or entity administering the poker-like game or tournament of the present invention. The house may be a bricks and mortar casino or business, or may a web site on the internet.

The "house rules" of a round specify the precise rules and way the round of a poker-like game of the present invention is played. House rules fill in any details that general rules of the game do not specify or specific modifications instituted by the house.

A "sporting event" is an athletic contest of some sort, or part of an athletic contest, or combination of athletic contests, including but not limited to a football game, baseball game, basketball game, hockey game, tennis match, golf tournament, race, Olympic event, boxing match, martial art fight, wrestling match, and eSport event. A "live event" refers to a sporting event or any other unpredictable event that that proceeds over time with an unambiguous beginning and end, including but not limited to an election, a stock price during some period of time, awards show, and an episode of a reality television show.

A "live sporting event" is a sporting event that is occurring in the present. A live sporting event can also include a prerecorded sporting event where the players do not know anything about the outcome or events that took place during the event.

A "betting event" is any part of a live sporting event with an unambiguous beginning and end. For example, in a football game, each drive is a possible betting event, as is each set of downs, each half and each quarter. The entire game can also be a betting event. In baseball, each at-bat, inning, and the entire game are possible betting events. In tennis, possible betting events include each game, set and match.

A "player" is someone who is participating in a hand or tournament of the present invention. The players sit at "tables" (i.e., virtual tables maintained on the host computer used to group together subsets of players). Players at the same table are in direct competition with each other and are able to place bets with one another during the same betting event. Players at different tables are not in direct competition and are not able to place bets with one another unless moved to the same table.

A "round of the tournament" is a period of the tournament that begins when (or just before) a sporting event or betting event starts, and ends when the sporting event or betting event terminates. A single tournament round may comprise a single round (hand) of the poker-like game corresponding to a single betting event. Alternatively, a single tournament round may comprise multiple rounds (hands) of the poker-like game corresponding to multiple betting events. At the start of each tournament round, players may be assigned to new virtual tables depending on the number of remaining players and the house rules, such as antes and limits on the bets, may be updated.

An "athlete" is a participant or member of a team playing in a live sporting event.

The "outcome" and "contingencies" occurring during a sporting or betting event is a set of statistics and other descriptors that summarize all relevant aspects of the sporting or betting event. For example, in a drive in a football game, the number of $3^{rd}$ down conversions, whether or not there was a fumble, and whether or not the drive ended in a touchdown are all outcomes or contingencies. The outcome of a live sporting or betting event is typically not known completely and with certainty until the event terminates.

A "card" is a token, physical or virtual, representing an athlete or some aspect or contingency of a sporting or betting event. The value of a card can be unambiguously determined from the final outcome of the event. For example, if the event is a drive in a football game, then in one embodiment of the present invention, a touchdown card is worth a specified amount of points if the drive ends in a touchdown, and no points otherwise, and a quarterback card is worth a specified amount of points for each yard passing by the quarterback during the drive. A card can also include a winner of a sporting event, winner from multiple sporting events (such as a tournament bracket), or fantasy points determined from the performance of an athlete during a sporting event. Before termination of the event, the values of the cards can typically only be approximated.

A "deck of cards" is a collection of cards that is used to play rounds of the poker-like game. A deck of cards is designed specifically for a given sporting event. There can be many different decks of cards associated with a given sporting event. Players at the same table use the same deck of cards In general, a hand is simply something each player possesses during a round of a tournament whose values at the end of the round determines the winner. For example, a "hand" can be a subset of the deck of cards that a player possesses during a round of the tournament.

A player is "in" a round of a betting game of the present invention if the player has not been disqualified (e.g., by folding or not paying an ante) and is still in contention for winning the round. A player that is no longer in the round is "out" or "disqualified".

The "remaining players" in a round are those players that are still in and able to play in the round.

A "chip" is a generic, electronic unit of currency for the poker-like tournament of the present invention. Antes, bets, raises and calls, are paid to the pot in units of chips.

The "pot" is the collection of chips paid by the players during a round of the tournament of the present invention in the form of antes, bets, raises and calls.

A player's "stack" of chips are the chips that is owned by the player and are available for future antes, bets, raises and calls. A player's stack of chips does not include chips that have already been paid to the pot during the current round. The player's stack of chips increases by the amount in the pot when the current round of the tournament ends, if the player wins that round.

An "ante" is a mandatory contribution to the pot that each player must pay, at certain times specified by the house rules, if the player wants to stay in the round. Players that do not pay their ante within the allotted time, also set by the house rules, are out of that round.

A "bet" is a voluntary donation to the pot by one of the remaining players. When a bet is made, a "betting round" begins. The remaining players must match the bet (call) before the betting round ends, or they are out (they fold). A betting round ends at some specified time after it begins, according to the house rules.

Overview

In the following detailed description of the preferred embodiments, reference is made to an accompanying drawing, which forms a part hereof, and in which is shown by way of illustration a specific embodiment in which the invention may be practiced. It is to be understood that other embodiments may be utilized and structural changes may be made without departing from the scope of the present invention.

The tournaments and poker-like games of the present invention are typically played while watching (or otherwise monitoring) a live event, preferably a live sporting event. The live event contains one or more betting events having an unambiguous beginning and end; such as a drive in a football game, a set in a tennis match, or an inning in a baseball game.

The players log into the tournament and place bets through a plurality of electronic units, which can be the players' own personal computers, cell phones or mobile devices. To administer the tournament, a host computer will typically announcing in advance a sequence of events that will be the basis for one or more rounds of the tournament; distribute an initial stack of chips to each player before the first round of the tournament; and host multiple rounds of a poker-like game during each round of the tournament. After the final round, the host computer will award prizes to the players with the highest chip totals.

Each round of the poker-like game generally comprises the host computer distributing a hand to each player. In some embodiments some or all of each player's hand is selected by the player from a given set of possible choices, such as a list of potential winners or outcomes of a collection of sporting events, or athletes participating in the sporting events. Alternatively the hands are randomly distributed to the players by the host computer. The players' hands may also comprise a plurality of cards, which can be selected from a deck through the computer network before or during a betting event that occurs during the live event. The players are able to place bets on the value of their hand during the round. The host computer monitors the live event until a termination event occurs and calculates a final value of each player's hand by combining the final values of each card within the hand, determines the winner at each table based on those final values, and awards the pot to the winners at each table.

A general process for administering such a tournament in one embodiment of the invention is illustrated in the flow chart of FIG. 1. As a tournament round begins, the host computer assigns players to virtual tables and provides chips to each player. The chips may be the chips the player had at the end of the previous round, or the chips may be an initial stack of chips provided at the start of the tournament. Depending on the version of the poker-like game, the players select their own hands corresponding to events that may take place during the sporting event. Alternatively, the hands are randomly provided to the players by the host computer. The host computer synchronizes each tournament round so that play at each virtual table uses the same betting events and begins at the same time.

Once the betting event begins, the players at each virtual table wait until one of the players makes a bet. Once the first bet of a new betting round is placed, the host computer starts a clock corresponding to a limited time period. At this time, each player has the option of calling the bet, folding, or optionally raising the bet. Players who do not call or raise within this time period are out of the betting round. If raises are permitted, the clock restarts giving the other players the option of calling or re-raising. Multiple betting rounds for the same betting event are permitted, although a waiting period may be required before a player can initiate the next betting. The amount of chips in the pot and in each player's hand is updated after each betting round and after the end of each betting event. Once the betting event is over, the value of each player's hand is calculated and the winner at each table is determined. This process is continued for each round of the tournament until the tournament is over. Each tournament can be designed to end after a certain number of rounds, until a certain number of players are eliminated, or until the live sporting event ends.

Optionally, the host computer announces the values of all prizes in advance and caps the number of participants. In other embodiments, there is no limit on the number of players allowed to participate in the tournament. In some embodiments, at least some information about players' hands is available to the other players to facilitate game play and limit bluffing.

Preferably, the events forming the basis of the hands are sporting events, or parts of sporting events, or multiple sporting events. In one embodiment, the sporting events are the drives in a football game, and the cards represent possible outcomes, contingencies, athletes, etc., associated with the drives. In one embodiment, the sporting events are the innings or half-innings in a baseball game, and the cards represent possible outcomes, contingencies, athletes, etc., associated with the innings. In one embodiment, the sporting events are the totality of games associated with a round (day or week) of daily fantasy sports, and the players' hands are the fantasy teams they draft. In one embodiment, the sporting events are the totality of games associated with a fantasy sports season, and the players' hands are the fantasy teams they draft. In one embodiment, the players' fantasy teams, or certain information associated with them, like their current point totals, are available to other players. In one embodiment, the sporting events are games in playoff tournaments, like NCAA basketball tournaments, and the players' hands are predicted winners of the games.

Example 1

One version of the tournament provided by the present invention involves playing a poker-like game based on fantasy sports contests in the context of a poker-like tournament; in particular, one or more daily fantasy sport contests where the players draft teams or participants from an upcoming sporting event. The tournament in this case proceeds as follows:

a) the host computer announces in advance the fantasy sports contests that will form the basis for the tournament;

b) after paying entrance fees, the plurality of players each receive an initial stack of chips to play with;

c) the players are assigned to virtual tables for the first round of the tournament;

d) in each round, each player drafts a fantasy sports team as they would in a traditional round of daily fantasy sports, except that the fantasy teams are kept secret from the other players throughout the tournament round; and e) the players play a round of a poker-like game wherein the player hands are the drafted fantasy teams; and f) after the last fantasy sports contest, the players with the most chips are the winners of the tournament.

The players are not dealt random cards by the host computer. Instead, the players choose their own hands through selection of the fantasy team. The value of a hand is the number of fantasy points the fantasy team accumulates during the contest. Optionally, during a round in the tournament, a player cannot initiate consecutive betting rounds at a table. Alternatively, a player can initiate consecutive betting rounds after a waiting period. Preferably, players can also raise bets during betting rounds (up to a predetermined number of times).

Optionally, players are reassigned to new virtual tables after each round. Players that lose all their chips during a round are out of the tournament. Players with chips at the end of one round carry them forward to the next round. House rules (e.g., number of players per table, antes, betting limits, consecutive-bet waiting period lengths) may change between rounds. The players with the most chips after the last tournament round are the winners.

Example 2

Another version of the tournament provided by the present invention involves playing a poker-like game based on the drives in a given football game where players are dealt hands from a special deck of cards, where the cards represent possible outcomes, statistics, and contingencies associated with the drives (such as interception, touchdown, or yardage gained by a particular player). The tournament in this case proceeds as follows:

a) The host computer announces in advance the football game that will form the basis for the tournament;

b) after paying entrance fees, the plurality of player receive an initial stack of chips to play with;

c) the players are assigned to virtual tables for the first round of the tournament;

d) each drive in the football game corresponds to a round (a hand) in the poker-like tournament, wherein before each drive, players at each table are dealt a hand from a special deck of cards designed for poker-like games based on football drives;

e) during each drive, players play a round of a poker-like game wherein each drive is a betting event; and f) at the end of the football game, players with the most chips are the winners of the tournament.

Preferably, players can initiate consecutive betting rounds after a waiting period. Preferably, players can also raise bets during betting rounds (up to a predetermined number of times). Optionally, players are reassigned to new virtual tables after each round (drive). Players that lose all their chips during a round are out of the tournament. Players with chips at the end of one round carry them forward to the next round. House rules (e.g., number of players per table, antes, betting limits, consecutive-bet waiting period lengths) may change between rounds. The players with the most chips after the last tournament round (the end of the football game) are the winners.

Example 3

Another version of the tournament provided by the present invention involves playing a poker-like game based on the drives in a given football game where players choose some or all of their own hands from a special deck of cards, where the cards represent possible outcomes, statistics, and contingencies associated with the drives. The tournament proceeds as follows:

a) the host computer announces in advance the football game that will form the basis for the tournament;

b) after paying entrance fees, the plurality of players receive an initial stack of chips to play with;

c) the players are assigned to virtual tables for the first round of the tournament;

d) each drive in the football game corresponds to a round (a hand) in the poker-like tournament, wherein players choose their hands, or a portion thereof, from a set of cards designed for poker-like games based on football drives;

e) during each drive, players play a round of a poker-like game wherein each drive is a betting event; and f) at the end of the football game the players with the most chips are the winners of the tournament.

There may be a cost associated with selecting each card, such as in fantasy sport team drafts, or other rules associated with choosing cards. The host computer may contribute more cards to the players' hands by randomly dealing them from the deck. Preferably, players can initiate consecutive betting rounds after a waiting period. Preferably, players can also raise bets during the betting round (up to a predetermined number of times). Optionally, players are reassigned to new virtual tables after each round (drive). Players that lose all their chips during a round are out of the tournament. Players with chips at the end of one round carry them forward to the next round. House rules (e.g., number of players per table, antes, betting limits, consecutive-bet waiting period lengths) may change between rounds. The players with the most chips after the last tournament round are the winners.

Example 4

Another version of the poker-like tournament provided by the present invention involves playing a poker-like game based on brackets filled out for a championship tournament, like the NCAA basketball tournament, in the context of a poker-like tournament. If the championship tournament has 64 initial teams (like the NCAA basketball tournament) then the poker-like tournament proceeds as follows:

a) the host computer announces in advance the championship tournament that will form the basis for the poker-like tournament;

b) after paying entrance fees, the plurality of players receive an initial stack of chips to play with;

c) the players are assigned to tables for the first round of the tournament;

d) each player fills out their brackets (i.e., selects the winner of each game) for the first round, which are kept secret from other players;

e) the players play a round of a poker-like game wherein the player hands are the selected brackets; and f) when the championship tournament is over, the players with the most chips are the winners of the poker-like tournament.

Preferably, the first round of the poker-like tournament involves the first two rounds of the NCAA championship tournament (32+16=48 games), while the second round involves the third and fourth rounds of the championship tournament (8+4=12 games), and the third, and final round, involves the remaining rounds of the championship tournament and, optionally, consolation game (2+1+1=4 games). In this embodiment, the players' hands are the brackets they fill out. The value of a bracket depends on the number of correct picks, or some other criteria spelled out in advance. Players fill out their brackets and are reassigned to tables before the second and third rounds.

Preferably, players can initiate consecutive betting rounds after a waiting period. Preferably, players can also raise bets during the betting round (up to a predetermined number of times). Optionally, players are reassigned to new virtual tables after each round (drive). Players that lose all their chips during a round are out of the tournament. Players with chips at the end of one round carry them forward to the next round. House rules (e.g., number of players per table, antes, betting limits, consecutive-bet waiting period lengths) may change between rounds. The players with the most chips after the last tournament round are the winners.

Having now fully described the present invention in some detail by way of illustration and examples for purposes of clarity of understanding, it will be obvious to one of ordinary skill in the art that the same can be performed by modifying or changing the invention within a wide and equivalent range of conditions, elements and other parameters without affecting the scope of the invention or any specific embodiment thereof, and that such modifications or changes are intended to be encompassed within the scope of the appended claims.

When a group of materials, compositions or components is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every combination of components described or exemplified herein can be used to practice the invention, unless otherwise stated. In the disclosure and the claims, "and/or" means additionally or alternatively. Moreover, any use of a term in the singular also encompasses plural forms.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. All headings used herein are for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

What is claimed is:

1. A method of playing a tournament between a plurality of players on electronic units connected through a computer network to a host computer, where the tournament comprises one or more tournament rounds and is based on a live event comprising a plurality of betting events, wherein the host computer performs the steps of:

a) announcing in advance to each of the electronic units a sequence of events that will be the basis for the rounds of the tournament;

b) distributing an initial stack of chips to each player before a first round of the tournament;

c) hosting one or more rounds of an electronic game during each round of the tournament consisting of the steps:
   i. assigning the plurality of players to virtual tables, and providing each player with a stack of chips equal to the chip total at the end of the previous round, or the initial stack in the first round;
   ii. providing a player hand to each player through the computer network before or during a betting event, wherein the value of the player hands depends on what happens during the betting event;
   iii. providing player-initiated betting rounds during the betting event before final values of the player hands are determined, wherein the plurality of players are allowed to place bets, calls and raises through the computer network based on the perceived value of the cards distributed to the players until the betting event is terminated;
   iv. keeping track of all antes, bets, and calls at every table during the round;
   v. monitoring the betting event until a termination event occurs;
   vi. upon termination of the betting event, determining a final value of each player hand based on actions during the betting event, determining the winner at each table in each round of the electronic game, and awarding the antes, bets, raises, and calls from the players at the table to the winner; and
   vii. updating all players' chip totals; and
d) after the final tournament round, awarding prizes to the player or players with the highest chip totals.

2. The method of claim 1, wherein the host computer announces the values of all prizes in advance and caps the number of participants.

3. The method of claim 1, wherein the hands are randomly distributed to the players by the host computer.

4. The method of claim 1, wherein some or all of the players' hands are chosen by the players from a given set of possible choices.

5. The method of claim 1, wherein some information about players' hands are available to the other players.

6. The method of claim 1, wherein there is no limit on the number of players allowed to participate in the tournament.

7. The method of claim 1, where a player cannot initiate consecutive betting rounds at a table.

8. The method of claim 1, wherein a player can only initiate a consecutive betting round at a table after a waiting period has elapsed.

9. The method of claim 1, wherein players cannot initiate a new betting round while a current betting round is in progress.

10. The method of claim 1, wherein the players are reassigned tables after each tournament round.

11. The method of claim 1, wherein the events forming the basis of the hands are sporting events, or parts of sporting events, or multiple sporting events.

12. The method of claim 11, wherein the sporting events are drives in a football game, and the cards represent possible outcomes, statistics, and contingencies associated with the drives.

13. The method of claim 11, wherein the sporting events are innings or half innings in a baseball game, and the cards represent possible outcomes, statistics, and contingencies associated with the innings.

14. The method of claim 11, wherein the sporting events are the totality of games associated with a round of a daily fantasy sports game, and the players' hands are a fantasy team drafted by the player.

15. The method of claim 11, wherein the sporting events are the totality of games associated with a fantasy sports season, and the players' hands are a fantasy team drafted by the player.

16. The method of claim 11, wherein the sporting events are games in a playoff tournament, and the players' hands are predicted winners of the games.

17. The method of claim 11, wherein certain information associated with each player's hand is available to other players.

18. The method of claim 1, wherein the initial stack of chips for each player is the same size.

19. The method of claim 1, wherein the time allowed for players to call a bet is random.

20. The method of claim 1, wherein the time allowed for players to call a bet is fixed.

\* \* \* \* \*